United States Patent
Wong et al.

(10) Patent No.: US 7,827,403 B2
(45) Date of Patent: Nov. 2, 2010

(54) METHOD AND APPARATUS FOR ENCRYPTING AND DECRYPTING DATA IN A DATABASE TABLE

(75) Inventors: Daniel ManHung Wong, Sacramento, CA (US); Chon Hei Lei, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1069 days.

(21) Appl. No.: 11/106,181

(22) Filed: Apr. 13, 2005

(65) Prior Publication Data

US 2006/0236104 A1    Oct. 19, 2006

(51) Int. Cl.
H04L 29/06 (2006.01)
H04L 9/08 (2006.01)
G06F 11/30 (2006.01)
G06F 7/04 (2006.01)
G06F 7/00 (2006.01)
G06F 17/30 (2006.01)
G06F 12/00 (2006.01)
H04L 9/00 (2006.01)

(52) U.S. Cl. .................... 713/168; 380/282; 726/27; 713/193; 707/709; 707/710

(58) Field of Classification Search .............. 713/168
See application file for complete search history.

(56) References Cited

U.S. PATENT DOCUMENTS

| 6,792,425 B2* | 9/2004 | Yagawa et al. ............... 707/10 |
| 7,111,005 B1* | 9/2006 | Wessman ..................... 726/27 |
| 2001/0019614 A1 | 9/2001 | Madoukh ..................... 380/277 |
| 2003/0123671 A1* | 7/2003 | He et al. ..................... 380/282 |

(Continued)

FOREIGN PATENT DOCUMENTS

WO    WO 01/35226 A1    5/2001

(Continued)

OTHER PUBLICATIONS

Ernesto Damiani, S. De Capitani Vimercati, Sushil Jajodia, Stefano Paraboschi, Pierangela Samarati, "Balancing confidentiality and efficiency in untrusted relational DBMSs", Oct. 2003, CCS '03: Proceedings of the 10th ACM conference on Computer and communications security, pp. 93-102.*

(Continued)

Primary Examiner—Michael Pyzocha
Assistant Examiner—Courtney D Fields
(74) Attorney, Agent, or Firm—Park, Vaughan, Fleming & Dowler LLP; Laxman Sahrasbuddhe (57) ABSTRACT

One embodiment of the present invention provides a system that decrypts an encrypted column in a row. During operation, the system receives the encrypted column in the row. The system then determines a security domain associated with the encrypted column in the row, wherein the security domain represents a set of columns in rows encrypted using the same key. Next, the system determines a key associated with the security domain. The system then decrypts the encrypted column in the row using the key. Note that using a security domain to represent a set of columns in rows enables the database to grant access to data within the database at arbitrary levels of granularity.

24 Claims, 6 Drawing Sheets

U.S. PATENT DOCUMENTS

2006/0053112 A1* 3/2006 Chitkara et al. ............ 707/9
2008/0133935 A1* 6/2008 Elovici et al. ............ 713/193

FOREIGN PATENT DOCUMENTS

WO   WO 2008041810 A1 * 4/2008

OTHER PUBLICATIONS

Publication entitled "A Cryptographically Secure EW Database With Selective Random Access", by N. Ikram et al., University of Bradford, Electrical Engineering Department, 1997, IEEE, pp. 1407-1411.

Publication entitled "Cryptography and Relational Database Management Systems", by Jingmin He et al., IBM T.J. Watson Research Center, 2001, IEEE, pp. 273-284.

Publication entitled "Efficient Key Updates in. Encrypted Database Systems", by Hakan Hacigumus et al., IBM Almaden Research Center, USA, SDM 2005, LNCS 3674, XP-002384598, pp. 1-15.

Publication entitled "Views as the Security Objects in a Multilevel Secure Relational Database Management System", by Jackson Wilson, TRW Defense Systems Group, 1988, IEEE, pp. 70-84.

* cited by examiner

METHOD AND APPARATUS FOR ENCRYPTING AND DECRYPTING DATA IN A DATABASE TABLE

FIELD OF THE INVENTION

The present invention relates to database security. More specifically, the present invention relates to a method and an apparatus for encrypting columns in rows of a database table.

BACKGROUND

Related Art

As computer systems store ever-larger amounts of sensitive data, it is becoming increasingly important to protect this sensitive data from unauthorized accesses. The global costs incurred from such database security breaches can run into billions of dollars annually, and the cost to individual companies can be severe, sometimes catastrophic.

Database systems often use encryption to protect sensitive data from unauthorized accesses. Current database encryption techniques are suitable for system architectures with three tiers: an application tier, a mid-tier, and a database tier. In these architectures, the mid-tier usually enforces access control, i.e., the mid-tier decides whether a user can access a particular column of a particular row.

Unfortunately, mid-tiers often have security holes that can cause sensitive data to be compromised. Additionally, this approach for protecting sensitive data does not work in client-server based architectures that usually do not have a mid-tier.

Furthermore, in hosting environments, a table may be used for storing sensitive data that belongs to different users. In such situations, the database system needs to ensure that a user can only access rows that belong to him/her. Database systems typically use filters to prevent a user from accessing sensitive data that belongs to other users. Unfortunately, a user may be able to access sensitive data that belongs to another user by evading these filters.

Additionally, database systems are increasingly being used to store "large objects" (LOBs) in a column of a row. In some situations, these LOBs contain sensitive information that needs to be accessible only to the LOB's owner. Unfortunately, present database systems do not allow data to be encrypted at such small granularities. Furthermore, the DBA can easily access these documents because the DBA typically has access to the encryption keys.

Furthermore, re-keying—encrypting data using a new key—poses a major performance problem in present database systems. This is because tables often contain millions of rows of data, and re-keying requires decrypting and encrypting a column in all rows.

Hence, what is needed is a method and an apparatus for database encryption without the above-described drawbacks.

SUMMARY

One embodiment of the present invention provides a system that decrypts an encrypted column in a row. During operation, the system receives the encrypted column in the row. The system then determines a security domain associated with the encrypted column in the row, wherein the security domain represents a set of columns in rows encrypted using the same key. Next, the system determines a key associated with the security domain. The system then decrypts the encrypted column in the row using the key. Note that using a security domain to represent a set of columns in rows enables the database to grant access to data within the database at arbitrary levels of granularity.

In a variation on this embodiment, the system determines the key associated with the security domain by: receiving a user-key; identifying an encrypted-key associated with the security domain; decrypting the encrypted-key using the user-key; performing an integrity check on the decrypted encrypted-key; and if the decrypted encrypted-key passes the integrity check, setting the key to be equal to the decrypted encrypted-key.

In a variation on this embodiment, the system identifies the encrypted-key associated with the security domain by determining an appropriate encrypted-key from a set of encrypted-keys based on the System Change Number (SCN).

One embodiment of the present invention provides a system that inserts a column of a row into a table. During operation, the system receives a request to insert the column of the row. The system then determines a security domain based on the request, wherein the security domain represents a set of columns in rows encrypted using the same key. Next, the system determines a key associated with the security domain. The system then encrypts the column of the row using the key. Next, the system inserts the encrypted column of the row into the table.

In a variation on this embodiment, while inserting the encrypted column of the row into the table, the system associates the encrypted column of the row with the security domain, thereby enabling the database to subsequently determine the appropriate key to decrypt the encrypted column of the row.

In a variation on this embodiment, the system can receive a request to re-key a second security domain using a new-key. The system then identifies an old set of columns in rows associated with the second security domain. Next, the system decrypts the old set of columns in rows. The system then encrypts the old set of decrypted columns in rows using the new-key to create a new set of columns in rows. Next, the system replaces the old set of columns in rows with the new set of columns in rows. Note that using a security domain to represent a set of columns in rows substantially improves re-keying performance because the database only needs to re-key data in the rows associated with a security domain, instead of re-keying all rows in the table.

In a variation on this embodiment, while replacing the old set of columns in rows, the system encrypts the new-key with the user-key and associates the encrypted new-key with the second security domain.

In a variation on this embodiment, the system determines the security domain by determining a default security domain based on a user identifier associated with the request to insert the column of the row.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Database System

Figure 1:
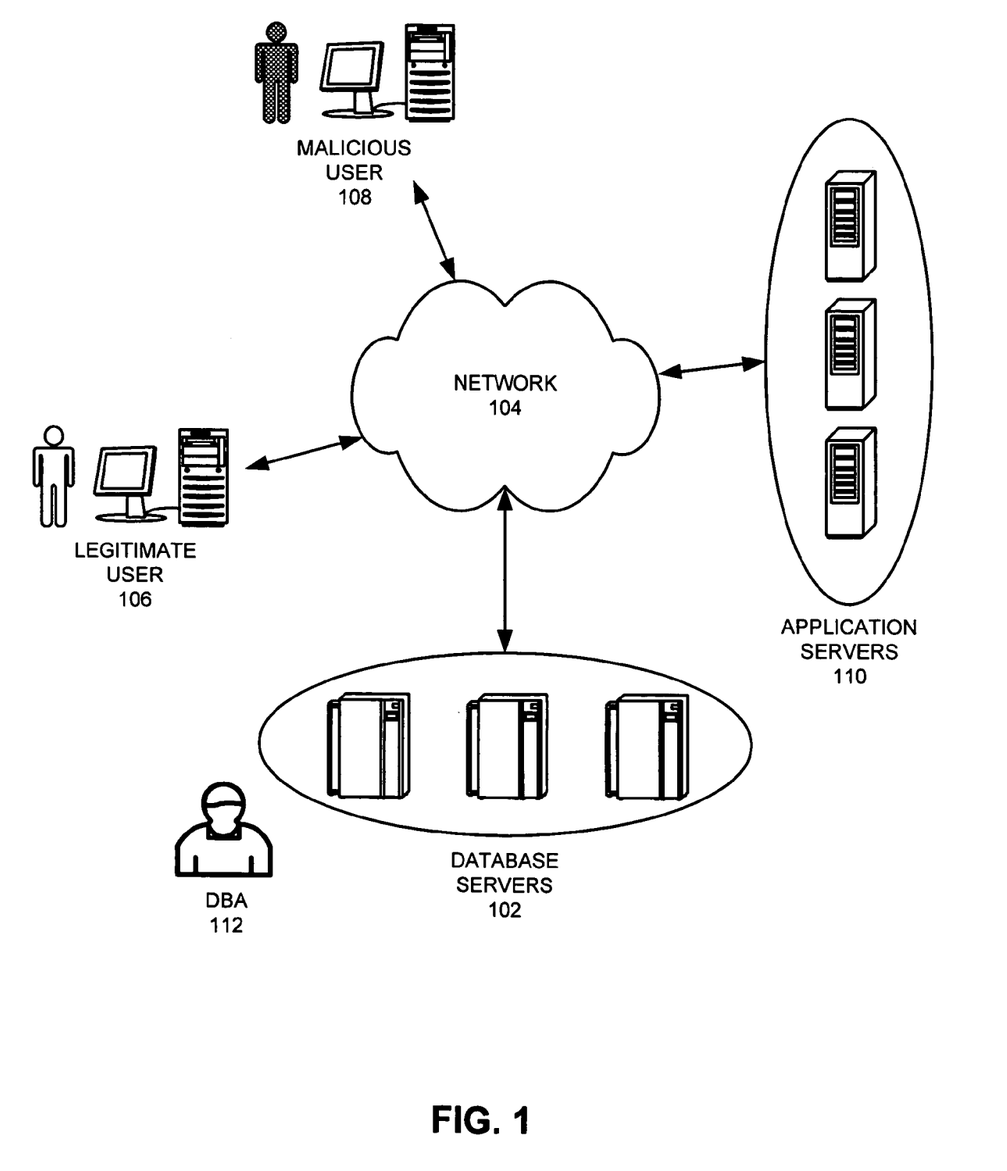
FIG. 1 illustrates a database system in accordance with an embodiment of the present invention.

FIG. 1 illustrates a database system in accordance with an embodiment of the present invention. This database system includes two users (or clients), namely, legitimate user 106 and malicious user 108. Database system also includes a set of application servers 110, a set of database servers 102, and a database administrator (DBA) 112. Users 106 and 108, application servers 110, and database servers 102 can communicate with one another via network 104.

Networks 104 can generally include any type of wire or wireless communication channel capable of coupling together computing nodes. This includes, but is not limited to, a local area network, a wide area network, or a combination of networks. In one embodiment of the present invention, network 104 can include the Internet. Network 104 can also be a private network. Note that in some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

Database administrator (DBA) 112 is responsible for the operation and maintenance of database servers 102, and typically has the privilege to modify data stored in the storage system.

Database clients allow a user, such as legitimate user 106, to enter data through a user interface, such as a web browser. This data can be sent to one of the application servers 110 across network 104. The application server then forms a database query using the data supplied by client 106 and forwards this query to the database servers 102 across network 108. Database servers 102 validate the query and, if valid, perform the requested operation.

Database systems are being used to store ever-larger amounts of sensitive data. As a result, it is becoming increasingly important to protect sensitive data from persons attempting to access or modify data beyond their authority. For example, a database system may want to allow legitimate users, such as user 106, to access data, but prevent malicious users, such as users 108, from accessing or modifying data. Furthermore, a database system also needs to prevent malicious DBAs from accessing private data.

To solve these security problems, database systems often use encryption. In these systems, the data is encrypted using a key and stored on a storage medium. Note that this technique provides a high level of security because even if a malicious user gains access to the encrypted data, the malicious user will not be able to decrypt the data without the key.

In present database systems, the key is often stored on a database server. Unfortunately, this can be a serious security problem because a DBA who has access to the key can decrypt private data.

Note that a database table is logically structured in terms of rows and columns. Specifically, a table can be viewed as a set of rows, wherein each row comprises a set of columns. In other words, "a column in a row" can be viewed as the smallest unit of data managed by the database system. Hence, "a set of columns in rows" represents an arbitrary portion of data stored in the database system.

Present database systems allow the user to encrypt the whole table or one or more columns in the table. Specifically, present database systems do not allow a user to encrypt different rows of the same table using different keys. In other words, present database systems do not allow users to encrypt an arbitrary portion of data in the database system.

Note that present approaches for encrypting data are suitable for system architectures with three tiers: an application tier, a mid-tier, and a database tier. In these architectures, the mid-tier usually enforces access control, i.e., the mid-tier decides whether a user can access a particular column of a particular row. Hence, these architectures are safe in as much as the mid-tier can be trusted with preventing a malicious user from accessing sensitive data.

Unfortunately, mid-tiers often have security holes that can cause sensitive data to be compromised. Additionally, this approach does not work in client-server based architectures that usually do not have a mid-tier.

Recall that, one of the problems with present database systems is that a DBA usually has access to the keys which allows the DBA to access sensitive data. Note that even if we store the keys in a secure location—thereby preventing a DBA from accessing the keys—we can still run into security problems. For example, in hosting environments, a table may be used for storing sensitive data that belongs to different users. In such situations, the database system needs to ensure that a user can only access rows that belong to him/her. Database systems typically use filters to prevent a user from accessing sensitive data that belongs to other users. Unfortunately, a user may be able to access sensitive data that belongs to another user by evading these filters.

Furthermore, note that a column in a row typically stores standard data types, such as, integers, character strings, etc. But, database systems are increasingly being used to store non-standard data types in these data elements. For example, a column in a row can be used to store a "large object" (LOB), such as a document. In some situations, these LOBs store sensitive information that needs to be accessible only to the owner of the large object. Unfortunately, present database systems do not allow a user to encrypt data at such small granularities. Furthermore, the DBA can easily access these documents because the DBA typically has access to the encryption keys.

Additionally, re-keying poses a major performance problem in present database systems. Recall that present database systems force the user to employ the same key for a column in all of the rows. Hence, re-keying involves decrypting a column in all of the rows, and then encrypting the column in all of the rows using the new key. Since tables often contain millions of rows of data, re-keying can require a substantial amount of computation in present database systems.

Overview

One embodiment of the present invention comprises a key management system that associates rows with keys. Whenever there is a reference to a row, the key management system provides an appropriate key to perform the database operation. Furthermore, one embodiment includes an extension to the command execution system which performs database operations on encrypted database objects by interacting with the key management system.

Note that the relationship between rows and keys can be a many to one relationship. This means that each row only maps to one key, but multiple rows can map to the same key to facilitate sharing of keys. Optionally, we can enhance this mapping by including additional fields such as column, user identifier, etc. For example, a column in a row can be associated with a key. (Note that, in this example, a row can be associated with multiple keys—one for each encrypted column in the row.)

The extension to the command execution system typically includes a capability to recognize that the rows in the table may have different keys, which allows the system to derive a modified query plan. Specifically, the modified query plan forces a parallel query slave to run for each unique encryption key. For example, if three distinct encryption keys are used for rows in a table, the modified query plan issues three query slaves, each with its own key. Since each query slave performs its operation with the appropriate key, it eliminates any confusion about which key to use or to cache for the entire operation, thereby making the operation transparent to the rest of the engine.

Security Domain

A security domain represents a set of columns in rows encrypted using the same key. Recall that a database table is logically structured in terms of rows and columns. Specifically, a table can be viewed as a set of rows, wherein each row comprises a set of columns. Hence, "a set of columns in rows" represents an arbitrary set of data elements stored in the database system. Consequently, a security domain represents an arbitrary set of data elements encrypted using the same key in a database.

Figure 2:
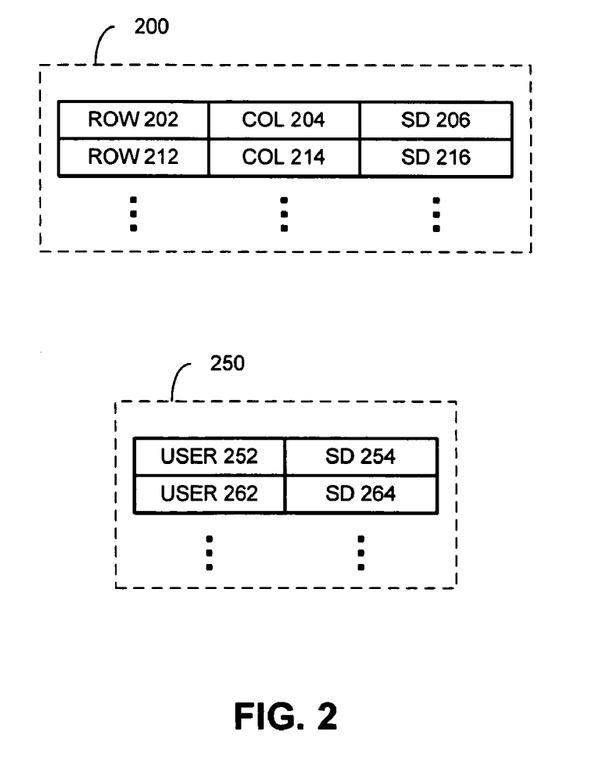
FIG. 2 illustrates how a column in a row can be associated with a security domain in accordance with an embodiment of the present invention.

FIG. 2 illustrates how a column in a row can be associated with a security domain in accordance with an embodiment of the present invention.

Data structure 200 associates row 202 and column 204 with security domain 206. Similarly, row 212 and column 214 are associated with security domain 216. Note that data structure 200 can be used to find a security domain based on a given row and column. Similarly, data structure 200 can also be used to find the set of rows and columns that belong to a particular security domain.

Data structure 250 associates user identifiers 252 and 262 with security domains 254 and 264, respectively. Note that this data structure can be used to identify a "default security domain" associated with a user.

It will be apparent to one skilled in the art that a security domain can also be associated with other system parameters. Furthermore, various embodiments of these data structures will be apparent to practitioners in the art. For example, data structure 200 can be implemented as a table in a database.

In general, these data structures help the system to identify an appropriate security domain for a given set of encrypted data elements, which enables the system to identify an appropriate key to decrypt the set of encrypted data elements. Accordingly, many modifications and variations will be apparent to practitioners skilled in the art. In particular, the above-described data structures are not intended to limit the present invention.

Process for Decrypting an Encrypted Column in a Row

Figure 3:
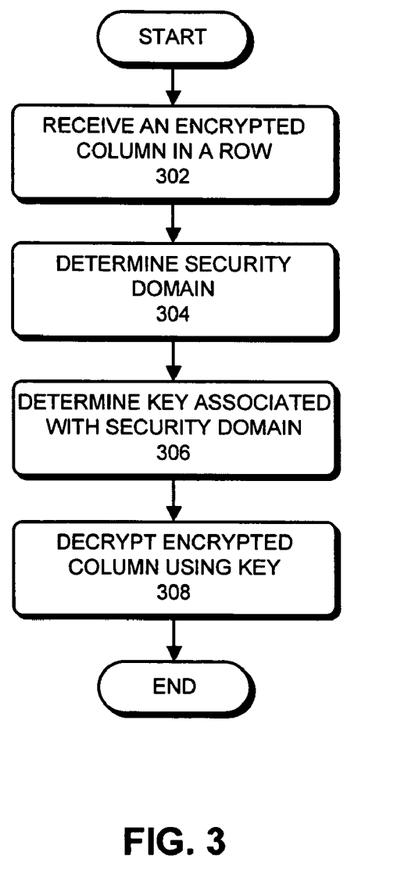
FIG. 3 presents a flowchart that illustrates a process for decrypting an encrypted column in a row in accordance with an embodiment of the present invention.

FIG. 3 presents a flowchart that illustrates a process for decrypting an encrypted column in a row in accordance with an embodiment of the present invention.

The process typically begins by receiving an encrypted column in a row (step 302).

Next, the system determines a security domain associated with the encrypted column in the row (step 304). In another embodiment, the system determines a security domain based on the user, instead of the specific row and column that needs to be decrypted.

The system then determines a key associated with the security domain (step 306).

Figure 4:
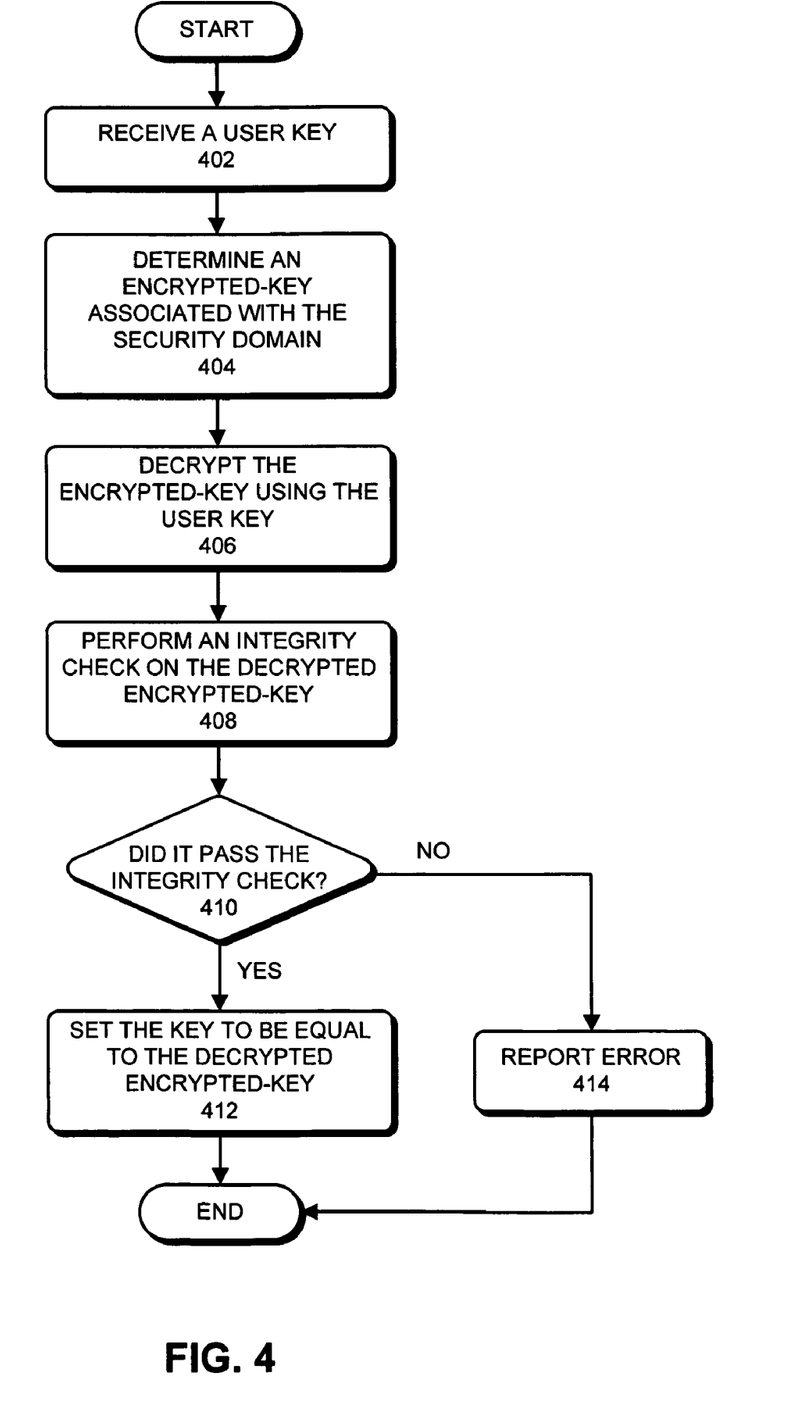
FIG. 4 presents a flowchart that illustrates a process of determining a key associated with the security domain in accordance with an embodiment of the present invention.

FIG. 4 presents a flowchart that illustrates a process of determining a key associated with the security domain in accordance with an embodiment of the present invention.

Specifically, the process of determining a key can begin by receiving a user-key (step 402).

Next, the system identifies an encrypted-key associated with the security domain (step 404).

Note that, storing encrypted keys in the database can prevent a DBA from decrypting encrypted data because the user-key is usually not accessible to the DBA. As a result, the DBA cannot decrypt the encrypted key which prevents the DBA from decrypting the encrypted data.

Figure 5:
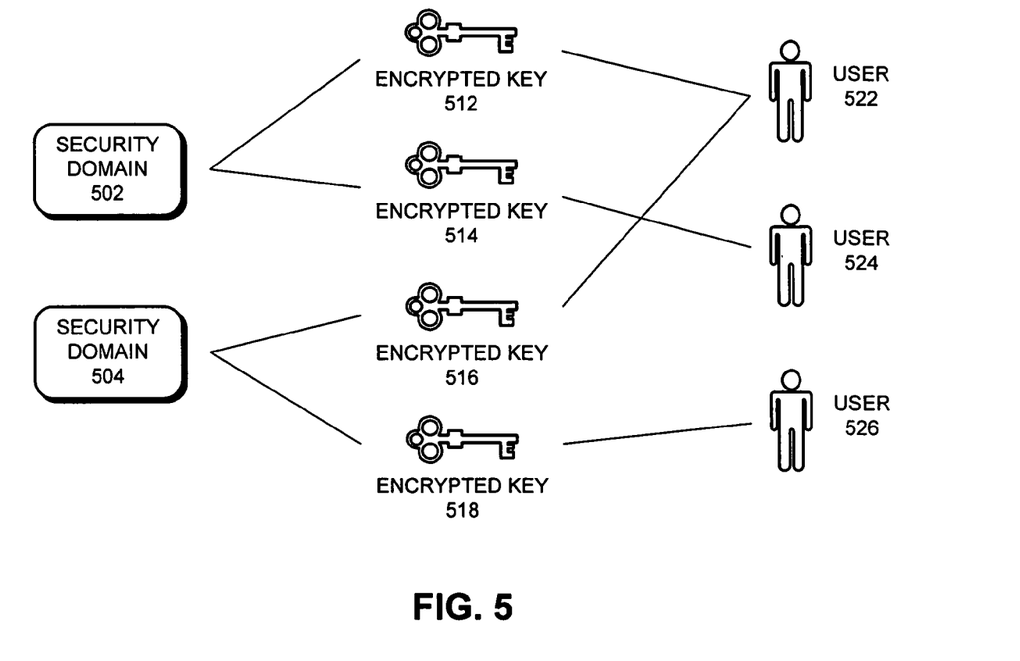
FIG. 5 illustrates how a system can encrypt keys associated with security domains in accordance with an embodiment of the present invention.

FIG. 5 illustrates how a system can encrypt keys associated with security domains in accordance with an embodiment of the present invention.

Encrypted key 512 is associated with security domain 502, and can be encrypted using a user-key that belongs to user 522. Encrypted key 514 is associated with security domain 502, and encrypted keys 516 and 518 are associated with security domain 504. Moreover, encrypted key 514 is encrypted using user 524's key, and encrypted keys 516 and 518 are encrypted using user 522's key and user 526's key, respectively.

Note that a security domain has only one key, but this key can be encrypted using different user keys. Further, the user-key can be a symmetric key or the private key of an asymmetric encryption technique. The system can use asymmetric encryption as follows. The system first encrypts a security domain's key using a user's public key. The system then uses the user's private key to decrypt the encrypted key.

Figure 6:
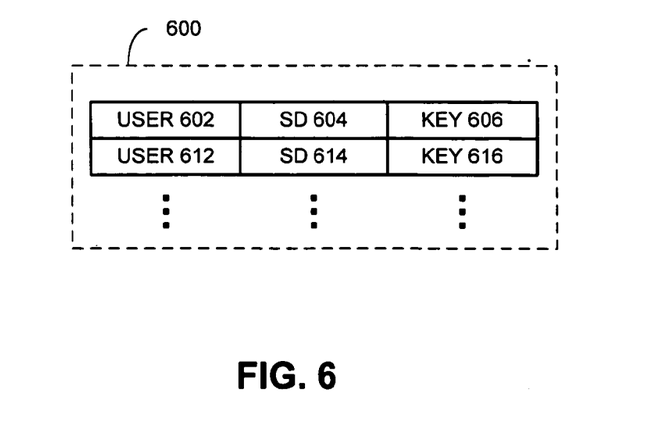
FIG. 6 illustrates a data structure that can be used to associate a security domain with an encrypted key in accordance with an embodiment of the present invention.

FIG. 6 illustrates a data structure that can be used to associate a security domain with an encrypted key in accordance with an embodiment of the present invention.

Data structure 600 associates user identifier 602 and security domain 604 with encrypted key 606, and user identifier 612 and security domain 614 with encrypted key 616. It will be apparent that other parameters can also be used to associate a security domain with an encrypted key. For example, in one embodiment, the system identifies an encrypted key based on three parameters: a user identifier, a security domain, and a System Change Number (SCN), which is a monotonically increasing counter that can be used to determine the order in which transactions are processed by the database. Note that over time, the system may re-key a security domain. As a result, the system may need to identify the appropriate encrypted-key associated with the security domain based on the SCN. In another embodiment, the system can use a timestamp to determine the appropriate encrypted-key associated with the security domain. Note that various embodiments of these data structures will be apparent to practitioners in the art. For example, data structure 600 can be a table in a database.

Continuing with the flowchart of FIG. 4, the system then decrypts the encrypted key using the user key (step 406).

Next, the system performs an integrity check on the decrypted encrypted-key (step 408). Note that the integrity check ensures the validity of the user key.

If the decrypted encrypted-key passes the integrity check, the system sets the key to be equal to the decrypted encrypted-key (step 410).

On the other hand, if the decrypted encrypted-key does not pass the integrity check, the system can report an error (step 412).

Continuing with the flowchart of FIG. 3, the system then decrypts the encrypted column in the row using the key (step 308).

Note that using a security domain to represent a set of columns in rows enables the database to grant access to data within the database at arbitrary levels of granularity.

Process for Inserting a Column of a Row into a Table

Figure 7:
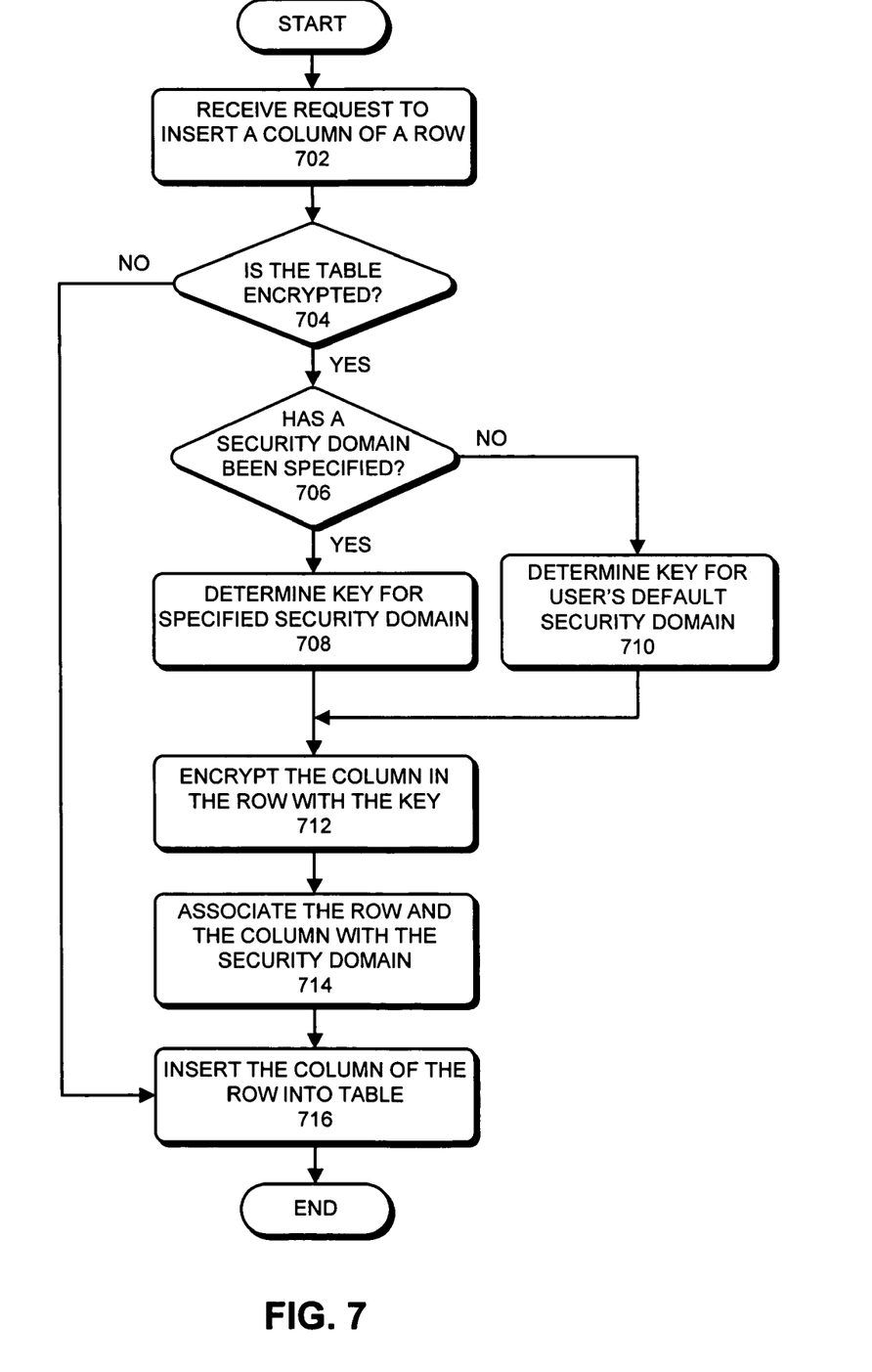
FIG. 7 presents a flowchart that illustrates a process for inserting a column of a row into a table in accordance with an embodiment of the present invention.

FIG. 7 presents a flowchart that illustrates a process for inserting a column of a row into a table in accordance with an embodiment of the present invention.

The process typically begins by receiving a request to insert a column of a row into a table (step 702). Note that, in one embodiment, the system may decide to insert a whole row even though it receives a request to insert only a few columns of the row.

Next, the system determines whether the table is encrypted or not (step 704).

If the table is not encrypted, the system inserts the column of the row into the table (step 716).

On the other hand, if the table is encrypted, the system determines whether a security domain is specified in the request (step 706).

If a security domain is specified, the system determines a key associated with the specified security domain (step 708).

On the other hand, if a security domain is not specified, the system determines a key associated with the user's default security domain (step 710). For example, the system can use data structure 250 to determine a default security domain associated with the user identifier. (Note that the request to insert a column in a row usually specifies the user identifier of the user who invoked the request.)

The system then encrypts the column of the row with the key (step 712).

Next, the system associates the row and column with the security domain (step 714).

Note that associating the encrypted column of the row with the security domain enables the database to subsequently determine the appropriate key to decrypt the encrypted column of the row. Specifically, the system can use data structure 200 to associate the row and column with the security domain.

Finally, the system inserts the column of the row into the table (step 716).

Process of Re-Keying a Security Domain

Figure 8:
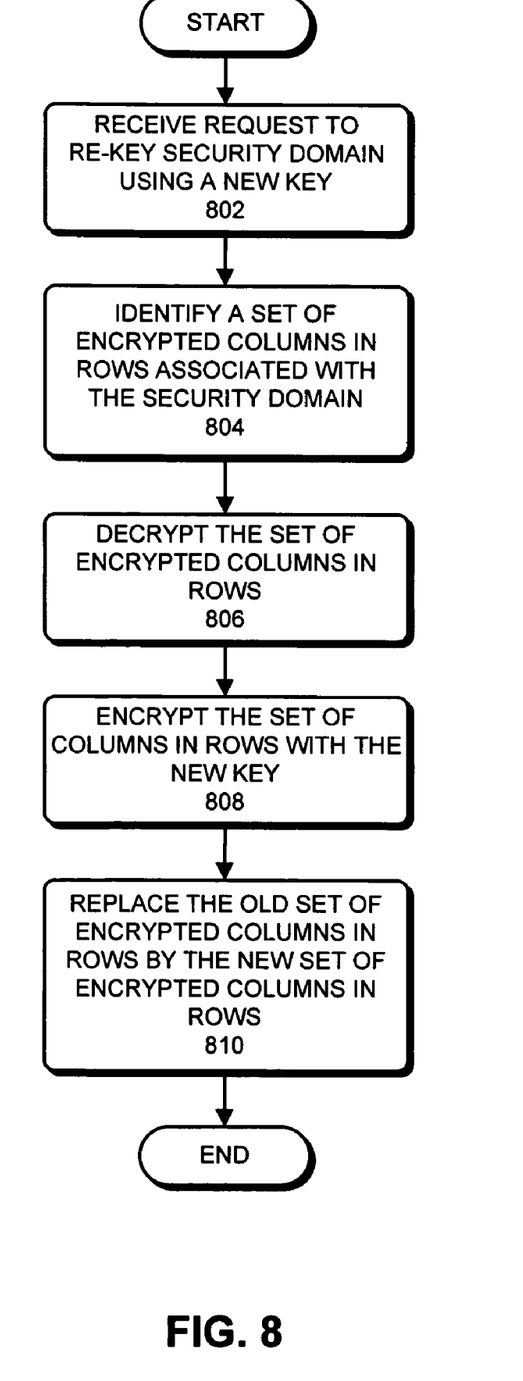
FIG. 8 presents a flowchart that illustrates a process for re-keying a security domain in accordance with an embodiment of the present invention.

FIG. 8 presents a flowchart that illustrates a process for re-keying a security domain in accordance with an embodiment of the present invention.

The process typically begins by receiving a request to re-key a security domain using a new key (step 802).

Next, the system identifies a set of columns in rows associated with the security domain (step 804).

The system then decrypts the set of columns in rows (step 806).

Next, the system encrypts the set of decrypted columns in rows using the new key to create a new set of columns in rows (step 808).

The system then replaces the set of columns in rows with the new set of columns in rows (step 810).

Note that the system can encrypt the new-key with a user-key and associate the encrypted new-key with the security domain. This enables the database to subsequently determine the appropriate key to decrypt the encrypted column of the row. Moreover, if the system uses asymmetric encryption, the system can use a locally stored copy of the user's public key to encrypt the new key. On the other hand, if the system uses symmetric encryption, the system may require the user to provide the user key so that the system can encrypt the new key.

Furthermore, using a security domain to represent a collection of columns in rows substantially improves re-keying performance because the database only needs to re-key data in the rows associated with a security domain, instead of re-keying all rows in the table.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for decrypting an encrypted column, the method comprising:
  receiving the encrypted column in a row of a table in the database, wherein the received encrypted column in the row is a part of a security domain associated with a key;
  determining, at the database system, the security domain associated with the encrypted column in the row, wherein at least two data elements associated with the security domain are associated with different column identifiers and different row identifiers;
  determining, at the database system, the key associated with the security domain;
  and decrypting the encrypted column in the row using the key.

2. The method of claim 1, wherein determining the key associated with the security domain involves:
  receiving a user-key from a user, wherein the user is one of a plurality of users having access to the security domain, and wherein the user-key is one of a plurality of user-keys associated with the users;
  identifying an encrypted-key associated with the security domain for the user from a plurality of encrypted-keys associated with the security domain for the plurality of users;
  decrypting the encrypted-key using the user-key;

performing an integrity check on the decrypted encrypted-key; and if the decrypted encrypted-key passes the integrity check, setting the key to be equal to the decrypted encrypted-key, wherein the same key can be decrypted from each of the plurality of encrypted-keys using a corresponding user-key.

3. The method of claim 2, wherein identifying the encrypted-key associated with the security domain involves determining an appropriate encrypted-key from a set of encrypted-keys based on a timestamp.

4. A method to insert a column, the method comprising:
receiving a request to insert the column in a row into a table in the database, wherein the received encrypted column in the row is a part of a security domain associated with a key;
determining, at the database system, the security domain based on the request, wherein at least two data elements associated with the security domain are associated with different column identifiers and different row identifiers;
determining, at the database system, the key associated with the security domain;
encrypting the column in the row using the key; and
inserting the encrypted column in the row into the table.

5. The method of claim 4, wherein determining the key associated with the security domain involves:
receiving a user-key from a user, wherein the user is one of a plurality of users having access to the security domain, and wherein the user-key is one of a plurality of user-keys associated with the users;
identifying an encrypted-key associated with the security domain for the user from a plurality of encrypted-keys associated with the security domain for the plurality of users;
decrypting the encrypted-key using the user-key;
performing an integrity check on the decrypted encrypted-key; and
if the decrypted encrypted-key passes the integrity check, setting the key to be equal to the decrypted encrypted-key, wherein the same key can be decrypted from each of the plurality of encrypted-keys using a corresponding user-key.

6. The method of claim 4, wherein inserting the encrypted column in the row into the table involves associating the encrypted column in the row with the security domain, thereby facilitating the database to subsequently determine an appropriate key to decrypt the encrypted column in the row.

7. The method of claim 4, comprising:
receiving a request to re-key a second security domain using a new-key;
identifying an old set of columns in rows associated with the second security domain;
decrypting the old set of columns in rows;
encrypting the old set of decrypted columns in rows using the new-key to create a new set of columns in rows; and
replacing the old set of columns in rows with the new set of columns in rows, thereby improving performance of re-keying data elements associated with the second security domain.

8. The method of claim 7, wherein replacing the old set of columns in rows involves encrypting the new-key with the user-key and associating the encrypted new-key with the second security domain.

9. The method of claim 5, wherein identifying the encrypted-key associated with the security domain involves determining an appropriate encrypted-key from a set of encrypted-keys based on a timestamp.

10. The method of claim 4, wherein determining the security domain involves determining a default security domain based on a user identifier associated with the request to insert the column in the row.

11. A non-transitory computer-readable storage medium storing instructions that when executed by a computer cause the computer to perform a method for decrypting an encrypted column, the method comprising:
receiving the encrypted column in a row of a table in the database, wherein the received encrypted column in the row is a part of a security domain associated with a key;
determining the security domain associated with the encrypted column in the row, wherein at least two data elements associated with the security domain are associated with different column identifiers and different row identifiers;
determining the key associated with the security domain; and
decrypting the encrypted column in the row using the key.

12. The computer-readable storage medium of claim 11, wherein determining the key associated with the security domain involves:
receiving a user-key from a user, wherein the user is one of a plurality of users having access to the security domain, and wherein the user-key is one of a plurality of user-keys associated with the users;
identifying an encrypted-key associated with the security domain for the user from a plurality of encrypted-keys associated with the security domain for the plurality of users;
decrypting the encrypted-key using the user-key;
performing an integrity check on the decrypted encrypted-key; and
if the decrypted encrypted-key passes the integrity check, setting the key to be equal to the decrypted encrypted-key, wherein the same key can be decrypted from each of the plurality of encrypted-keys using a corresponding user-key.

13. The computer-readable storage medium of claim 12, wherein identifying the encrypted-key associated with the security domain involves determining an appropriate encrypted-key from a set of encrypted-keys based on a timestamp.

14. A non-transitory computer-readable storage medium storing instructions that when executed by a computer cause the computer to perform a method to insert a column, the method comprising:
receiving a request to insert the column in a row into a table in the database, wherein the received encrypted column in the row is a part of a security domain associated with a key;
determining the security domain based on the request, wherein at least two data elements associated with the security domain are associated with different column identifiers and different row identifiers;
determining the key associated with the security domain;
encrypting the column in the row using the key; and
inserting the encrypted column in the row into the table.

15. The computer-readable storage medium of claim 14, wherein determining the key associated with the security domain involves:
receiving a user-key from a user, wherein the user is one of a plurality of users having access to the security domain, and wherein the user-key is one of a plurality of user-keys associated with the users;

identifying an encrypted-key associated with the security domain for the user from a plurality of encrypted-keys associated with the security domain for the plurality of users;

decrypting the encrypted-key using the user-key;

performing an integrity check on the decrypted encrypted-key; and if the decrypted encrypted-key passes the integrity check, setting the key to be equal to the decrypted encrypted-key, wherein the same key can be decrypted from each of the plurality of encrypted-keys using a corresponding user-key.

16. The computer-readable storage medium of claim 14, wherein inserting the encrypted column in the row into the table involves associating the encrypted column in the row with the security domain, thereby facilitating the database to subsequently determine an appropriate key to decrypt the encrypted column in the row.

17. The computer-readable storage medium of claim 14, comprising:

receiving a request to re-key a second security domain using a new-key;

identifying an old set of columns in rows associated with the second security domain;

decrypting the old set of columns in rows;

encrypting the old set of decrypted columns in rows using the new-key to create a new set of columns in rows; and replacing the old set of columns in rows with the new set of columns in rows, thereby improving performance of re-keying data elements associated with the second security domain.

18. The computer-readable storage medium of claim 17, wherein replacing the old set of columns in rows involves encrypting the new-key with the user-key and associating the encrypted new-key with the second security domain.

19. The computer-readable storage medium of claim 15, wherein identifying the encrypted-key associated with the security domain involves determining an appropriate encrypted-key from a set of encrypted-keys based on a timestamp.

20. The computer-readable storage medium of claim 14, wherein determining the security domain involves determining a default security domain based on a user identifier associated with the request to insert the column in the row.

21. A method for processing a database query, comprising:

receiving the database query;

determining, at the database server, if the target of the database query is a table which includes data elements associated with at least two security domains in the database, wherein each data element is associated with a column identifier and a row identifier, wherein at least two data elements associated with each security domain are associated with different column identifiers and different row identifiers, and wherein each of the at least two security domains is encrypted with different keys; and if so, determining, at the database server, the different keys for the database query;

retrieving the different keys for the database query; and processing the database query using the different keys by issuing a parallel query slave for each key.

22. The method of claim 21, wherein determining the different keys for the database query involves:

determining which security domains are associated with the query;

determining which keys are associated with each security domain; and retrieving associated keys for each security domain associated with the query.

23. A non-transitory computer-readable storage medium storing instructions that when executed by a computer cause the computer to perform a method for processing a database query, the method comprising:

receiving the database query;

determining if the target of the database query is a table which includes data elements associated with at least two security domains in the database, wherein each data element is associated with a column identifier and a row identifier, wherein at least two data elements associated with each security domain are associated with different column identifiers and different row identifiers, and wherein each of the at least two security domains is encrypted with different keys; and if so, determining the different keys for the database query;

retrieving the different keys for the database query; and processing the database query using the different keys by issuing a parallel query slave for each key.

24. The computer-readable storage medium of claim 23, wherein determining the different keys for the database query involves:

determining which security domains are associated with the query;

determining which keys are associated with each security domain; and retrieving associated keys for each security domain associated with the query.

* * * * *